(12) United States Patent
Matsuo et al.

(10) Patent No.: US 7,589,045 B2
(45) Date of Patent: Sep. 15, 2009

(54) EXHAUST GAS PURIFYING CATALYST AND EXHAUST GAS PURIFYING DEVICE THEREWITH FOR VEHICLE

(75) Inventors: Yuichi Matsuo, Wako (JP); Norihiko Suzuki, Wako (JP); Atsushi Furukawa, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 561 days.

(21) Appl. No.: 11/245,064

(22) Filed: Oct. 7, 2005

(65) Prior Publication Data

US 2006/0089255 A1 Apr. 27, 2006

(30) Foreign Application Priority Data

Oct. 21, 2004 (JP) ............................... 2004-306612

(51) Int. Cl.
*B01J 23/10* (2006.01)
(52) U.S. Cl. .................................................... 502/303
(58) Field of Classification Search .................. 502/303
See application file for complete search history.

(56) References Cited

U.S. PATENT DOCUMENTS 6,060,420 A 5/2000 Munakata et al.
7,199,079 B2 * 4/2007 Matsuo et al. .............. 502/333

FOREIGN PATENT DOCUMENTS

| JP | 06-100319 | 4/1994 |
|---|---|---|
| JP | 2003-175337 | 6/2003 |
| JP | 2004-041866 | 2/2004 |

\* cited by examiner

*Primary Examiner*—Melvin C Mayes
*Assistant Examiner*—Melissa Stalder
(74) *Attorney, Agent, or Firm*—Arent Fox LLP

(57) ABSTRACT

An exhaust gas purifying catalyst which exhibits sufficient efficiency during low temperature operation (below 400° C.) such as starting of a vehicle or idling operation can be provided by improving activation of a noble metal itself and preventing reduction of activation at high temperatures. In the catalyst, Pd is supported on a complex oxide having the ratio formula of $Ln_{1-a}X_aAl_{1-b}Z_bO_3$ (Ln: rare earth element, X: alkali earth metal, Z: 2 to 5 group or 12 to 14 group element, $0.02 \leq a \leq 0.30$, $0.02 \leq b \leq 0.30$).

5 Claims, 2 Drawing Sheets

$a = b \neq c$ $a = b = c$

EXHAUST GAS PURIFYING CATALYST AND EXHAUST GAS PURIFYING DEVICE THEREWITH FOR VEHICLE

BACKGROUND OF THE INVENTION

1. Technical Field

The present invention relates to an exhaust gas purifying catalyst and to an exhaust gas purifying device having the catalyst for vehicles, and in particular, relates to an exhaust gas purifying catalyst in which nitrogen oxides ($NO_x$), hydrocarbons (HC), and carbon monoxide (CO) contained in exhaust gas exhausted during a low-temperature operation of an internal combustion engine of vehicles can be simultaneously and efficiently purified and reduced.

2. Background Art

It is well known that noble metal elements (Pt, Rh, Pd, or Ir) exhibit superior purifying effects on exhaust gas such as CO, HC, NO and $NO_2$. It is desirable to use such metals in an exhaust gas purifying catalysts. Ordinarily, these noble metals are used mixed with or supported by $Al_2O_3$ which is a support having high specific surface area, together with an additive such as La, Ce and Nd. On the other hand, complex oxides such as perovskite which can be used in combination with many kinds of elements, have extremely various properties. Therefore, it is desirable to use the complex oxide in an exhaust gas purifying catalyst. Furthermore, it is known that properties of noble metals will change if the noble metal is supported on the complex oxide. In view of this, an exhaust gas purifying catalyst in which a noble metal is supported on a complex oxide can exhibit further appropriate properties for purifying exhaust gas.

Many kinds of such catalysts for purifying exhaust gas have been developed. For example, Japanese Unexamined Patent Application Publication No. Hei 06-100319 discloses a technique in which a part of noble metal elements are contained in a crystal of perovskite type structure. In this technique, it is disclosed that the noble metal is contained in the crystalline lattice of this structure, the particles of the noble metal are miniaturized and dispersed more, lattice defect contributing catalytic activity is appropriately generated, and therefore, the catalytic activation of the noble metal element can be improved. Furthermore, as a technique similar to the above-mentioned technique, Japanese Unexamined Patent Application Publication No. 2004-41866 discloses a technique in which Pd is solid-solved in a perovskite type complex oxide to improve heat resistance. There has been a problem, in that in the case in which the noble metal is Pd, PdO which is an active species for NO reduction reaction, is reduced to Pd having low activity. However, Japanese Unexamined Patent Application Publication No. 2003-175337 discloses a technique in which reduction of PdO is reduced by using a perovskite type complex oxide of A site defect type.

However, conventional exhaust gas purifying catalysts exhibit sufficient efficiency to purify CO, HC, $NO_x$ (NO, $NO_2$ or the like) in exhaust gas during operation of high temperature (above 400° C.) such as during running of a vehicle, although it cannot exhibit sufficient efficiency during low temperature operation (below 400° C.) such as at start of engine operation or idling operation.

The reason why it cannot exhibit sufficient efficiency to purify exhaust gas during low temperature operation is as follows. In the conventional exhaust gas purifying catalyst, noble metals such as Pt, Rh, Pd or the like are used while being supported on $Al_2O_3$ having high specific surface area. Since $Al_2O_3$ has high specific surface area, the noble metals are supported in a highly-dispersed condition. However, since $Al_2O_3$ is a stable compound and there is no interaction between $Al_2O_3$ and the noble metal supported, activity of the noble metal itself cannot be improved. Therefore, sufficient efficiency may not be obtained during low temperature operation.

It is desirable that Pd exist in a PdO-state having high activity during operation of vehicles. However, there is also a problem in that even if Pd initially exists in a PdO-state supported on $Al_2O_3$, it is reduced to be Pd in a metallic state at high temperature (above 900° C.), the Pd clumps, reducing the active sites, and as a result, activity is greatly decreased. This is because the supporting material $Al_2O_3$ cannot reduce mobility of Pd and cannot stabilize oxidizing conditions of PdO on the surface of the supporting material since the surface of the supporting material $Al_2O_3$ is extremely stable.

SUMMARY OF THE INVENTION

The present invention was completed in view of the above-mentioned circumstances, and an object of the invention is to provide an exhaust gas purifying catalyst in which sufficient efficiency can be exhibited even during low temperature operation (below 400° C.) at start of running of a vehicle or in idling operation by improving activation of a noble metal itself and preventing reduction of activity at high temperatures, and an exhaust gas purifying device therewith for vehicles.

The inventors researched about an exhaust gas purifying catalyst in which sufficient efficiency can be exhibited even during low temperature operation (below 400° C.) at start of running of vehicle or at idling operation. As a result, it became clear that Pd which initially existed in the PdO state did not become reduced to the metallic state of Pd even at high temperatures (above 900° C.), clumping of Pd was prevented, decrease of active sites was reduced, and deterioration of activity was suppressed to a minimum, by retaining appropriate composition of complex oxide supporting Pd, practically by using a complex oxide having a ratio formula of $Ln_{1-a}X_aAl_{1-b}Z_bO_3$ (Ln: rare earth element, X: alkali earth metal, Z: 2 to 5 group or 12 to 14 group element, $0.02 \leq a \leq 0.30, 0.02 \leq b \leq 0.30$). That is, it became clear that in the case in which the complex oxide having such a composition is used, since the complex oxide has a more unstable surface compared to a surface of $Al_2O_3$ conventionally used as a supporting material, the supporting material (the complex oxide) sufficiently exhibits effects of reducing mobility of Pd and stabilizing the oxide condition of PdO on the surface of the supporting material during operation of a vehicle, and as a result, the present invention was completed.

In the present invention (the first aspect of the invention), Pd is supported on a complex oxide having a ratio formula of $Ln_{1-a}X_aAl_{1-b}Z_bO_3$ (Ln: rare earth element, X: alkali earth metal, Z: 2 to 5 group or 12 to 14 group element, $0.02 \leq a \leq 0.30, 0.02 \leq b \leq 0.30$).

The inventors' research clarified that among the $Ln_{1-a}X_aAl_{1-b}Z_bO_3$, a trigonal or rhombohedral complex crystal having a crystalline structure of a perovskite type structure, has large electrical instability, and that therefore Pd neighboring to $Ln_{1-a}X_aAl_{1-b}Z_bO_3$ has larger electrical fluctuations compared to Pd independently existing. Therefore, oxidized conditions of the surface of Pd supported is mainly $Pd^{2+}$. Since this condition is desirable to perform purification of exhaust gas, high activity at low temperatures can be obtained. It should be noted that the inventors confirmed that high activity at low temperatures can be maintained even after the catalyst is exposed to conditions of about 1000° C.

The present invention (the second aspect of the invention) is performed in view of the above recognition. That is, in the exhaust gas purifying catalyst (the first aspect of the invention), it is desirable that the crystalline system of the complex oxide be a trigonal system or a rhombohedron system, and at the same time, the crystalline structure of the complex oxide be a perovskite type structure (the second aspect of the invention).

Furthermore, the inventors' research clarified that $Ln_{1-a}X_aAl_{1-b}Z_bO_3$ can be generated in single phase, and further, the surface of $Ln_{1-a}X_aAl_{1-b}Z_bO_3$ can yield conditions that easily interact with Pd when Pd is supported, by preparing $Ln_{1-a}X_aAl_{1-b}Z_bO_3$ via carboxylic acid complex polymer obtained by evaporating to dryness a nitrate water solution or chloride water solution of constituent elements containing carboxylic acid. In this way, an exhaust gas purifying catalyst in which Pd is supported on $Ln_{1-a}X_aAl_{1-b}Z_bO_3$ exhibits high activity at low temperatures.

The present invention (the third and fourth aspects of the invention) is performed in view of the above recognition. That is, in the exhaust purifying catalyst (the first and second aspects of the invention), it is desirable that the catalyst be produced via a process in which at least one kind selected form the group of compounds (carboxylic acid of carbon number 2 to 20 having OH group or SH group, dicarboxylic acid of carbon number 2 or 3, and monocarboxylic acid of carbon number 1 to 20) is added to a nitrate water solution or chloride water solution of constituent elements (the third aspect of the invention). Furthermore, in the exhaust gas purifying catalyst (the third aspect of the invention), it is desirable that the catalyst be produce via a producing process of carboxylic acid complex polymer by evaporating to dryness of the above-mentioned nitrate salt water solution, and via a sintering process of the carboxylic acid complex polymer (the fourth aspect of the invention).

As a carboxylic acid of carbon number 2 to 20 having OH group and SH group, oxycarboxylic acid, or a compound in which the oxygen atom of OH of this acid is substituted with a sulfur atom can be mentioned. The carbon number of these carboxylic acids is in a range from 2 to 20 from the viewpoint of solubility in water, desirably from 2 to 12, and more desirably from 2 to 8, and further desirably from 2 to 6. The carbon number of monocarboxylic acid is in a range from 1 to 20 from the viewpoint of solubility in water, desirably from 1 to 12, more desirably from 1 to 8, and further desirably from 1 to 6.

As a practical example of the carboxylic acid of carbon number 2 to 20 having OH group or SH group, glycolic acid, mercaptosuccinic acid, thioglycolic acid, lactic acid, β-hydroxypropionic acid, malic acid, tartaric acid, citric acid, iso-citric acid, allo-citric acid, gluconic acid, glyoxylic acid, glyceric acid, mandelic acid, tropic acid, benzilic acid, salicylic acid and the like can be mentioned. As a practical example of dicarboxylic acid, oxalic acid, malonic acid and the like can be mentioned. As a practical example of monocarboxylic acid, formic acid, acetic acid, propionic acid, butyric acid, iso-butyric acid, valeric acid, iso-valeric acid, hexanoic acid, heptanoic acid, 2-methylhexanoic acid, octanoic acid, 2-ethylhexanoic acid, nonanoic acid, decanoic acid, lauric acid and the like can be mentioned. Among these, acetic acid, oxalic acid, malonic acid, glycolic acid, lactic acid, malic acid, tartaric acid, glyoxylic acid, citric acid, gluconic acid, and the like are desirable, and oxalic acid, malonic acid, glycolic acid, lactic acid, malic acid, tartaric acid, glyoxylic acid, citric acid, gluconic acid and the like are more desirable.

Next, a method for production of the exhaust gas purifying catalyst of the present invention is explained. That is, this method for production is a method to desirably produce the above-mentioned exhaust gas purifying catalyst (the first to fourth aspects of the invention). Practically, in the process for production of exhaust gas purifying catalyst in which Pd is supported on complex oxide having composition formula $Ln_{1-a}X_aAl_{1-b}Z_bO_3$ (Ln: rare earth element, X: alkali earth metal, Z: 2 to 5 group or 12 to 14 group element, $0.02 \leq a \leq 0.30$, $0.02 \leq b \leq 0.30$), at least one kind selected from group of compounds (carboxylic acid of carbon number 2 to 20 having OH group or SH group, dicarboxylic acid of carbon number 2 or 3, and monocarboxylic acid of carbon number 1 to 20) is added to a nitrate water solution or chloride water solution of constituent elements.

In such a method for production of the exhaust gas purifying catalyst, it is desirable that a process in which nitrate salt water solution or chloride salt water solution is evaporated to dryness to produce carboxylic acid complex polymer and a sintering process to sinter the carboxylic acid complex polymer be included. Furthermore, it is more desirable that sintering temperature during the sintering process be not more than 1000° C.

The exhaust gas purifying catalyst produced as above is a basis of the present invention, and the inventors further researched about practical ways of using the invention (the first to fourth aspects of the invention), the inventors clarified that the exhaust gas purifying catalyst of the present invention is desirable to be used in an internal combustion engine, in particular, for vehicles, and the following fifth aspect of the invention was completed.

That is, the present invention (the fifth aspect of the invention) is an exhaust gas purifying device for vehicle which purifies exhaust gas from vehicles, in which Pd is supported by complex oxide, and in which the ratio formula of the above-mentioned complex oxide is $Ln_{1-a}X_aAl_{1-b}Z_bO_3$ (Ln: rare earth element, X: alkali earth metal, Z: 2 to 5 group or 12 to 14 group element, $0.02 \leq a \leq 0.30$, $0.02 \leq b \leq 0.30$). It should be noted that in the case in which requirements of the second to fourth aspects of the invention are added to such an exhaust gas purifying device for vehicle, sufficient efficiency can be exhibited in higher levels not only during start up of a vehicle but also during low temperature operation (below 400° C.) in idling. Such an exhaust gas purifying device for vehicle is shown in FIGS. 3A to 3C. In the figures, reference number 1 is a catalyst converter arranged in an exhaust system of vehicle. The catalyst converter 1 includes a catalyst part 1a, the catalyst part 1a includes a catalyst supporting honeycomb 4 supported in an outer cylinder 2 with a mat 3. In the catalyst supporting honeycomb 4, the catalyst powder 6 of the present invention is held by a cell wall 5.

EMBODIMENTS OF THE INVENTION

First, the effects of the invention (the first aspect of the invention) are explained. Complex oxides having the ratio formula of $Ln_{1-a}X_aAl_{1-b}Z_bO_3$ (Ln: rare earth element, X: alkali earth metal, Z: 2 to 5 group or 12 to 14 group element, $0.02 \leq a \leq 0.30$, $0.02 \leq b \leq 0.30$) has a structure in which an element having different radius from Ln or Al is solid dissolved at A site and B site of $LnAlO_3$. Since elements having different ion radius are solid-dissolved, crystalline structure is distorted, electric instability is increased, interaction with Pd which is supported is increased, and therefore, high activity can be obtained. Practically, as an element having different ion radius from Ln or Al, 2 group element (alkali earth metal) is applied to the A site, and 2 to 5 group element or 12 to 14 group element is applied to the B site to efficiently obtain the above-mentioned high activity.

The exhaust gas purifying catalyst of the present invention in which Pd is supported on $Ln_{1-a}X_aAl_{1-b}Z_bO_3$ has an effect of reducing reduction from PdO to Pd metal in high temperature operations. Ln (rare earth element) is known to be changed in form depending on the condition of the oxide. For example, it is known that if a catalyst in which Pd is supported on $La_2O_3$ is exposed to high temperatures, $La_2O_3$ migrates from contacting part of Pd and $La_2O_3$, to the surface of Pd particle, a structure in which Pd particles embedded in $La_2O_3$ is formed, and fine $La_2O_3$ migrates to the surface of Pd particle (Zhang et al., J. Phys. Chem., vol. 100, No. 2, p. 744-754, 1996). Also in the system of the present invention ($Ln_{1-a}X_aAl_{1-b}Z_bO_3$), Ln and Pd are in complex conditions by the above-mentioned behavior, to reduce reduction from PdO to Pd metal. By this effect, the exhaust gas purifying catalyst of the present invention can maintain high activity during low temperature operation (below 400° C.) after high-temperature endurance.

Figure 1:
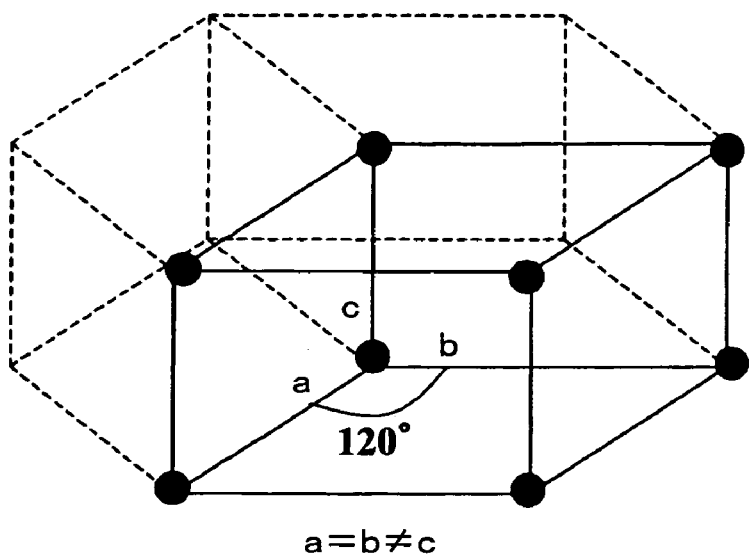
FIG. 1 is a perspective view showing an embodiment of a crystalline (trigonal crystal) Al oxide which constitutes the exhaust gas purifying catalyst of the present invention.
Figure 2:
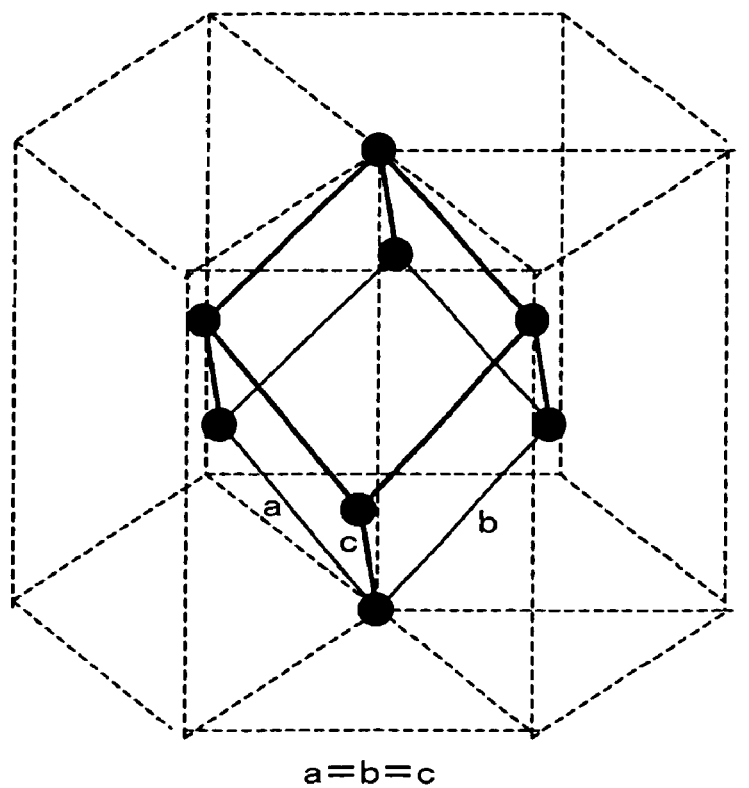
FIG. 2 is a perspective view showing an embodiment of a crystalline (rhombohedral) Al oxide which constitutes the exhaust gas purifying catalyst of the present invention.
Figure 3A:
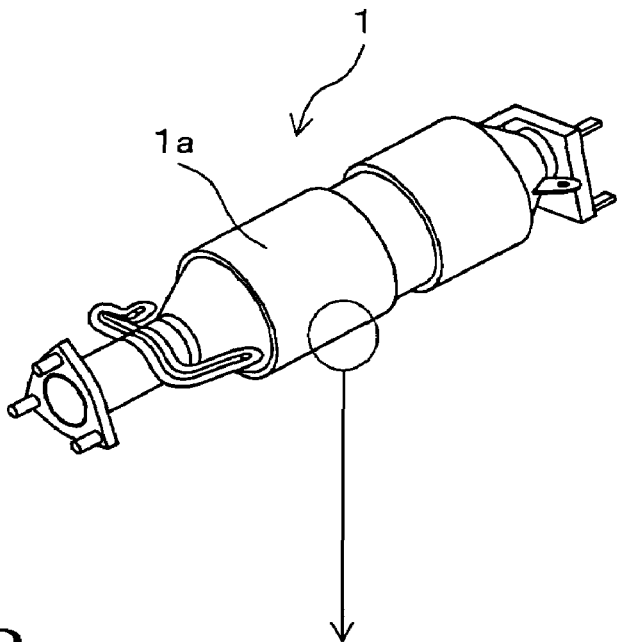
FIG. 3A is a schematic diagram of an example of catalyst converter in an exhaust system of vehicle.
Figure 3B:
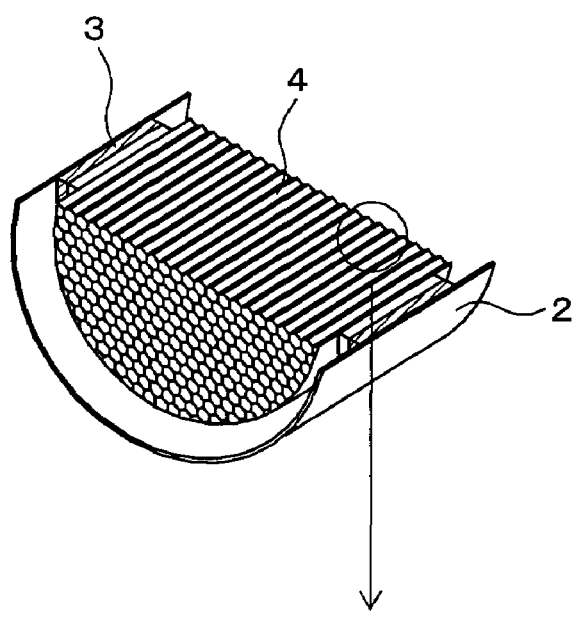
FIG. 3B is a cross sectional view of a catalyst part of the catalyst converter.
Figure 3C:
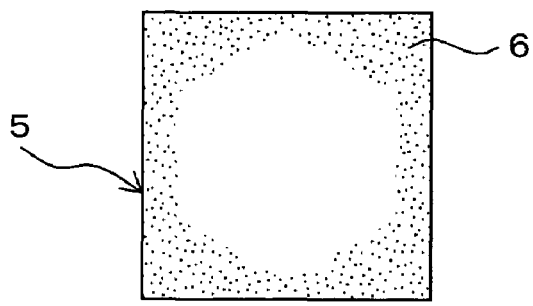
FIG. 3C is a schematic diagram of a cell wall of honeycomb which supports catalyst.

Next, effects of the present invention (the second aspect of the invention) are explained. Among $Ln_{1-a}X_aAl_{1-b}Z_bO_3$ in which most parts of the B site of complex oxide is Al, in particular in the case in which the crystalline system is a trigonal crystal or a rhombohedral crystal and the crystalline structure is a perovskite type structure, further superior catalytic efficiency can be exhibited. The trigonal crystal is a crystalline system in which a lattice is changed from a unit lattice of an ideal cubic crystal to a direction of the c axis and in which the angle between the a axis and the b axis is 120°, as shown in FIG. 1. That is, the trigonal crystal is a crystalline system in which ideal cubic perovskite is largely distorted, and in this crystalline system, conditions of electrons existing between constituent atoms is unstable. Next, the rhombohedral crystal is a crystalline system in which the trigonal crystal is expressed depending on a different basic axis, and therefore, the structure itself is the same. In addition, since a large part of the B site of perovskite is Al in $Ln_{1-a}X_aAl_{1-b}Z_bO_3$, a bond between Al and O has strong properties of a covalent bond. Therefore, an electric bias is generated to some degree in a perovskite crystal ordinarily having strong properties of an ionic bond.

As explained above, since the crystalline system is trigonal or rhombohedral, and since the crystalline structure is perovskite and a large part of the B site is Al, perovskite type complex oxide having a ratio formula of $Ln_{1-a}X_aAl_{1-b}Z_bO_3$ has large electrical instability compared to a conventionally known $LaFeO_3$ or the like as an exhaust gas purifying catalyst.

Owing to the electrical instability, PdO neighboring to $Ln_{1-a}X_aAl_{1-b}Z_bO_3$ has larger electrical fluctuations compared to PdO existing alone. As a result, most of the oxide condition of Pd in the PdO supported is $Pd^{2+}$. It is known that there are two kinds of oxide condition at the Pd surface, $Pd^{2+}$ and PdO (metallic condition), and $Pd^{2+}$ has higher activity in purifying exhaust gas. That is, the exhaust gas purifying catalyst in which Pd is supported on $Ln_{1-a}X_aAl_{1-b}Z_bO_3$ has high activity since the surface of Pd is in the state of $Pd^{2+}$. In addition, even after exposure to conditions of about 1000° C., high activity can be maintained at low temperature (below 400° C.) operation.

The effects of the present invention (the third and fourth aspects of the invention) are explained.

During production of $Ln_{1-a}X_aAl_{1-b}Z_bO_3$, by sintering carboxylic acid complex polymer which is produced by evaporating to dryness nitrate salt water solution or chloride salt water solution of constituent element including carboxylic acid, at relatively low temperature such as 800° C. or 900° C., $Ln_{1-a}X_aAl_{1-b}Z_bO_3$ is generated as a single phase. On the other hand, in the case in which $LaAlO_3$ which is similar to $Ln_{1-a}X_aAl_{1-b}Z_bO_3$ is produced by another method such as a solid phase reaction method, single phase $LaAlO_3$ is not generated even if sintering is performed at a high temperature of 1700° C. (Science of rare earths, published by Kagakudojin, written by Adachi Ginya, p. 564.). That is, since $Ln_{1-a}X_aAl_{1-b}Z_bO_3$ is a similar compound to $LaAlO_3$, $Ln_{1-a}X_aAl_{1-b}Z_bO_3$ of single phase can be synthesized at low temperatures by using carboxylic acid or the like. Therefore, sufficient specific surface area can be obtained, and in addition, the surface of the crystalline lattice can be maintained in activated condition. As a result, in the exhaust gas purifying catalyst in which Pd is supported on $Ln_{1-a}X_aAl_{1-b}Z_bO_3$ produced by the method of the present invention, since sufficient specific surface area and strong interaction of $Ln_{1-a}X_aAl_{1-b}Z_bO_3$ and Pd can be obtained, high activity at low temperatures can be realized.

EXAMPLES

The present invention is explained further practically as follows.

Example 1

Preparation of Complex Oxide for Supporting

Predetermined amount of lanthanum nitrate hexahydrate, calcium nitrate, aluminum nitrate nonahydrate and magnesium nitrate were dissolved in ion exchanged water to prepare a mixture water solution. Next, a predetermined amount of malic acid was dissolved in ion exchanged water to prepare malic acid water solution. These two water solutions were mixed, placed on a hot plate stirrer, and heated at 250° C. while stirring with a stirring bar. After water was evaporated, the mixture was dried and pulverized in a mortar. This was put in an alumina crucible, heated at a rate of 2.5° C./min to 350° C., and heat treated at 350° C. for 3 hours in a muffle kiln. In this way, a temporary burned substance from which malic acid salt and sulfate species were removed was prepared. The temporary burned substrate was pulverized and mixed in a mortar for 15 minutes, put in an alumina crucible again, heated at a rate of 5° C./min to 900° C., and heat treated at 900° C. for 10 hours. In this way, perovskite complex oxide having a composition of $Ln_{0.8}Ca_{0.2}Al_{0.8}Mg_{0.2}O_3$ was prepared.

(Supporting of Noble Metal)

Next, predetermined amount of palladium nitrate dihydrate was dissolved in ion exchanged water to prepare a palladium nitrate water solution. Then, the palladium nitrate water solution and a predetermined amount of $LaAlO_3$ powder were put in an egg plant shaped flask, the mixture was evaporated to dryness while reducing the pressure in the flask by a rotary evaporator in a hot-water bath at 60° C. After that, the temperature was increased to 250° C. at a heating rate of 2.5° C./min in a muffle kiln, and then increased to 750° C. at a heating rate of 5° C./min, and kept at 750° C. for 3 hours. In this way, catalyst powder of Example 1 having formula of $Pd/La_{0.8}Ca_{0.2}Al_{0.8}Mg_{0.2}O_3$ in which Pd is immersed and supported on $La_{0.8}Ca_{0.2}Al_{0.8}Mg_{0.2}O_3$ was obtained.

(Evaluation of Activity)

Activity of initial and after endurance treatment of the catalyst powder of Example 1 was evaluated. The evaluation was performed by flowing test exhaust gas of a vehicle through the catalyst under conditions of A/F (air-fuel ratio) corresponding to 14.6 and SV (space velocity) 50000 $h^{-1}$. The endurance treatment was performed by a model exhaust gas corresponding to 14.6 of A/F at an endurance temperature of 900° C. for 20 hours. These results are shown in Tables 1 and 2. That is, temperatures at which 50% of CO, HC and NO were purified at the temperature increasing test of the catalyst (evaluation of efficiency of catalyst before the endurance treatment) are shown, and purified ratios of CO, HC, NO at 400° C. after the temperature increasing test of the catalyst after the endurance treatment (evaluation of efficiency of catalyst after the endurance treatment) are shown.

TABLE 1

| Sample | | Temperature of 50% purified (° C.) | | |
|---|---|---|---|---|
| | | HC | CO | NO |
| Example 1 | $Pd/La_{0.8}Ca_{0.2}Al_{0.8}Mg_{0.2}O_3$ | 349 | 327 | 266 |
| Example 2 | $Pd/La_{0.8}Sr_{0.2}Al_{0.8}Mg_{0.2}O_3$ | 336 | 314 | 254 |
| Example 3 | $Pd/La_{0.8}Ca_{0.2}Al_{0.8}Ti_{0.2}O_3$ | 359 | 311 | 312 |
| Example 4 | $Pd/La_{0.8}Ca_{0.2}Al_{0.8}Nb_{0.2}O_3$ | 358 | 310 | 290 |
| Example 5 | $Pd/La_{0.8}Ca_{0.2}Al_{0.8}Zn_{0.2}O_3$ | 356 | 311 | 270 |
| Example 6 | $Pd/La_{0.8}Ca_{0.2}Al_{0.8}Ga_{0.2}O_3$ | 349 | 303 | 269 |
| Example 7 | $Pd/Pr_{0.8}Ca_{0.2}Al_{0.8}Mg_{0.2}O_4$ | 337 | 313 | 264 |
| Example 8 | $Pd/La_{0.8}Ca_{0.2}Al_{0.8}Li_{0.2}O_3$ | 378 | 362 | 379 |
| Example 9 | $Pd/Gd_{0.8}Ca_{0.2}Al_{0.8}Li_{0.2}O_3$ | 370 | 346 | 400 |
| Example 10 | $Pd/La_{0.8}Y_{0.2}Al_{0.8}Mg_{0.2}O_3$ | 412 | 393 | >450 |
| Example 11 | $Pd/La_{0.8}Ca_{0.2}Al_{0.8}Mn_{0.2}O_3$ | 371 | 327 | >450 |
| Example 12 | $Pd/La_{0.8}Ca_{0.2}Al_{0.8}Co_{0.2}O_3$ | 372 | 327 | 291 |
| Example 13 | $Pd/Al_2O_3$ | 390 | 369 | 391 |
| Example 14 | $Pd/La_{0.8}Ca_{0.2}Al_{0.8}Mg_{0.2}O_3$ (Solid state reaction) | 382 | 332 | 298 |

TABLE 2

| Sample | | Purified ratio at 400° C. (%) | | |
|---|---|---|---|---|
| | | HC | CO | NO |
| Example 1 | $Pd/La_{0.8}Ca_{0.2}Al_{0.8}Mg_{0.2}O_3$ | 92.7 | 94.4 | 93.5 |
| Example 2 | $Pd/La_{0.8}Sr_{0.2}Al_{0.8}Mg_{0.2}O_3$ | 93.0 | 95.3 | 93.0 |
| Example 3 | $Pd/La_{0.8}Ca_{0.2}Al_{0.8}Ti_{0.2}O_3$ | 90.0 | 91.9 | 85.2 |
| Example 4 | $Pd/La_{0.8}Ca_{0.2}Al_{0.8}Nb_{0.2}O_3$ | 89.7 | 92.8 | 88.8 |
| Example 5 | $Pd/La_{0.8}Ca_{0.2}Al_{0.8}Zn_{0.2}O_3$ | 89.8 | 90.1 | 93.1 |
| Example 6 | $Pd/La_{0.8}Ca_{0.2}Al_{0.8}Ga_{0.2}O_3$ | 92.6 | 90.8 | 92.4 |
| Example 7 | $Pd/Pr_{0.8}Ca_{0.2}Al_{0.8}Mg_{0.2}O_4$ | 93.2 | 95.1 | 94.0 |
| Example 8 | $Pd/La_{0.8}Ca_{0.2}Al_{0.8}Li_{0.2}O_3$ | 76.0 | 80.0 | 69.6 |
| Example 9 | $Pd/Gd_{0.8}Ca_{0.2}Al_{0.8}Li_{0.2}O_3$ | 83.4 | 88.2 | 71.9 |
| Example 10 | $Pd/La_{0.8}Y_{0.2}Al_{0.8}Mg_{0.2}O_3$ | 60.4 | 77.1 | 55.7 |
| Example 11 | $Pd/La_{0.8}Ca_{0.2}Al_{0.8}Mn_{0.2}O_3$ | 84.8 | 87.2 | 79.0 |
| Example 12 | $Pd/La_{0.8}Ca_{0.2}Al_{0.8}Co_{0.2}O_3$ | 84.7 | 88.3 | 87.4 |
| Example 13 | $Pd/Al_2O_3$ | 61.9 | 72.1 | 59.7 |
| Example 14 | $Pd/La_{0.8}Ca_{0.2}Al_{0.8}Mg_{0.2}O_3$ (Solid state reaction) | 81.2 | 83.2 | 76.9 |

Example 2

$Pd/La_{0.8}Sr_{0.2}Al_{0.8}Mg_{0.2}O_3$ was prepared in a similar manner to that of Example 1, and evaluation was performed. Results are also shown in Tables 1 and 2.

Example 3

$Pd/La_{0.8}Ca_{0.2}Al_{0.8}Ti_{0.2}O_3$ was prepared in a similar manner to that of Example 1, and evaluation was performed. Results are also shown in Tables 1 and 2.

Example 4

$Pd/La_{0.8}Ca_{0.2}Al_{0.8}Nb_{0.2}O_3$ was prepared in a similar manner to that of Example 1, and evaluation was performed. Results are also shown in Tables 1 and 2.

Example 5

$Pd/La_{0.8}Ca_{0.2}Al_{0.8}Zn_{0.2}O_3$ was prepared in a similar manner to that of Example 1, and evaluation was performed. Results are also shown in Tables 1 and 2.

Example 6

$Pd/La_{0.8}Ca_{0.2}Al_{0.8}Ga_{0.2}O_3$ was prepared in a similar manner to that of Example 1, and evaluation was performed. Results are also shown in Tables 1 and 2.

Example 7

$Pd/Pr_{0.8}Ca_{0.2}Al_{0.8}Mg_{0.2}O_4$ was prepared in a similar manner to that of Example 1, and evaluation was performed. Results are also shown in Tables 1 and 2.

Example 8

$Pd/La_{0.8}Ca_{0.2}Al_{0.8}Li_{0.2}O_3$ was prepared in a similar manner to that of Example 1, and evaluation was performed. Results are also shown in Tables 1 and 2.

Example 9

$Pd/Gd_{0.8}Ca_{0.2}Al_{0.8}Li_{0.2}O_3$ was prepared in a similar manner to that of Example 1, and evaluation was performed. Results are also shown in Tables 1 and 2.

Example 10

$Pd/La_{0.8}Y_{0.2}Al_{0.8}Mg_{0.2}O_3$ was prepared in a similar manner to that of Example 1, and evaluation was performed. Results are also shown in Tables 1 and 2.

Example 11

Pd/La$_{0.8}$Ca$_{0.2}$Al$_{0.8}$Mn$_{0.2}$O$_3$ was prepared in a similar manner to that of Example 1, and evaluation was performed. Results are also shown in Tables 1 and 2.

Example 12

Pd/La$_{0.8}$Ca$_{0.2}$Al$_{0.8}$Co$_{0.2}$O$_3$ was prepared in a similar manner to that of Example 1, and evaluation was performed. Results are also shown in Tables 1 and 2.

Example 13

Noble metal was supported on a commercially available alumina (trade name: AF115, produced by Sumitomo Chemical Co., Ltd.) in a similar manner to that of Example 1 to prepare Pd/Al$_2$O$_3$, and evaluation was performed. Results are also shown in Table 1 and 2.

Example 14

Predetermined amount of lanthanum oxide, calcium carbonate, aluminum oxide, and magnesium oxide were mixed in agate mortar and put in an alumina crucible, and sintered at 1100° C. for 10 hours in a muffle kiln, to prepare La$_{0.8}$Ca$_{0.2}$Al$_{0.8}$Mg$_{0.2}$O$_3$ by a solid phase reaction method. Using this, Pd/La$_{0.8}$Ca$_{0.2}$Al$_{0.8}$Mg$_{0.2}$O$_3$ was prepared by making Pd supported in a similar manner to that of Example 1, and evaluation was performed. Results are shown in Tables 1 and 2.

According to Tables 1 and 2, the exhaust gas purifying catalyst of Examples 1 to 7 exhibit superior results both before and after the endurance treatment. The reason is as follows. That is, all of the exhaust gas purifying catalysts of Examples 1 to 7 are a catalyst in which Pd is supported on a complex oxide having the ratio formula of Ln$_{1-a}$X$_a$Al$_{1-b}$Z$_b$O$_3$ (Ln: rare earth element, X: alkali earth metal, Z: 2 to 5 group or 12 to 14 group element, $0.02 \leq a \leq 0.30$, $0.02 \leq b \leq 0.30$), these catalyst have an effect of reducing reduction from Pd$^{2+}$ to Pd at high temperatures, and therefore the catalyst can maintain high activity even after being exposed to high temperatures. Furthermore, since the crystalline system of Al oxide in the exhaust gas purifying catalyst of Examples 1 to 7 is trigonal or rhombohedral, and since the crystalline structure is a perovskite structure, electrical instability is high. Therefore, Pd which is neighboring to La$_{0.8}$Ca$_{0.2}$Al$_{0.8}$Mg$_{0.2}$O$_3$ or the like has higher electrical fluctuations compared to Pd existing alone. Furthermore, during the production process of La$_{0.8}$Ca$_{0.2}$Al$_{0.8}$Mg$_{0.2}$O$_3$ or the like of the exhaust gas purifying catalyst of Examples 1 to 7, La$_{0.8}$Ca$_{0.2}$Al$_{0.8}$Mg$_{0.2}$O$_3$ or the like is generated in single phase by using carboxylic acid complex polymer by evaporating to dryness nitrate salt water solution of constituent element including carboxylic acid, and when Pd is supported on the surface, it interacts easily with Pd. It should be noted that malic acid was used in the production of the mixture water solution; however, it became clear that similar results can be obtained also in the case in which citric acid or oxalic acid is used.

On the other hand, a reason why the exhaust gas purifying catalyst of Examples 8 to 14 cannot obtain sufficient efficiency before and after endurance treatment compared to Examples 1 to 7, is explained next. Since an element without 2 to 5 group and 12 to 14 group is used at the B site of the oxide which is a supporting material in the exhaust purifying catalyst of Examples 8, 9, 11, and 12, superior results were not obtained. Furthermore, since an element without alkali earth metal is used at an A site of the oxide of the supporting material in the exhaust purifying catalyst of Example 10, superior effects were not obtained. Furthermore, in the exhaust gas purifying catalyst of Example 13, since Al$_2$O$_3$ is a stable compound and it does not interact with noble metal Pd which is supported, activity of Pd itself is not increased. In addition, in the exhaust gas purifying catalyst of Example 14, since carboxylic acid or the like is not added during the production, supporting material of single phase cannot be synthesized. Therefore, sufficient specific surface area cannot be obtained and the surface of crystalline lattice cannot be utilized in activated condition.

The exhaust gas purifying catalyst of the present invention can be applied to an internal combustion engines of vehicles which is recently required to efficiently purify and reduce nitrogen oxide (NO$_x$), hydrocarbon (HC), and carbon monoxide (CO) all contained in exhaust gas.

What is claimed is:

1. An exhaust gas purifying catalyst comprising:
   a complex oxide having a ratio formula of Ln$_{1-a}$X$_a$Al$_{1-b}$Z$_b$O$_3$, wherein Ln is a rare earth element, X is an element selected from Group 2 of the periodic table, Z is an element selected from Groups 2, 3, 5, and 12 to 14 of the periodic table, $0.02 < a < 0.30$, and $0.02 < b < 0.30$; and
   Pd which is supported on the complex oxide,
   wherein the catalyst is produced via a process in which at least one compound is added to a nitrate salt or chloride salt water solution of constituent element;
   wherein the compound is selected from the group consisting of: carboxylic acid having 2 to 20 carbons and an OH group or SH group; dicarboxylic acid having 2 to 3 carbons; and monocarboxylic acid having 1 to 20 carbons.

2. The exhaust gas purifying catalyst according to claim 1, which is produced via a process in which the nitrate salt water solution or the chloride salt water solution is evaporated to dryness to produce carboxylic acid complex polymer and via a sintering process in which the carboxylic acid complex polymer is sintered.

3. An exhaust gas purifying device for vehicles comprising the exhaust gas purifying catalyst according to claim 1.

4. An exhaust gas purifying catalyst comprising:
   a complex oxide having a ratio formula of Ln$_{1-a}$X$_a$Al$_{1-b}$Z$_b$O$_3$, wherein Ln is a rare earth element, X is an element selected from Group 2 of the periodic table, Z is an element selected from Groups 2, 3, 5, and 12 to 14 of the periodic table, $0.02 < a < 0.30$, and $0.02 < b < 0.30$; and
   Pd which is supported on the complex oxide, wherein a crystalline system of the complex oxide is trigonal or rhombohedral, and a crystalline structure of the complex oxide is a perovskite structure, and
   wherein the catalyst is produced via a process in which at least one compound is added to a nitrate salt or chloride salt water solution of constituent element,
   wherein the compound is selected from the group consisting of: carboxylic acid having 2 to 20 carbons and an OH group or SH group; dicarboxylic acid having 2 to 3 carbons; and monocarboxylic acid having 1 to 20 carbons.

5. The exhaust gas purifying catalyst according to claim 4, which is produced via a process in which the nitrate salt water solution or the chloride salt water solution is evaporated to dryness to produce carboxylic acid complex polymer and via a sintering process in which the carboxylic acid complex polymer is sintered.

* * * * *